United States Patent [19]

Ohmura

[11] Patent Number: 4,756,114
[45] Date of Patent: Jul. 12, 1988

[54] TUBULAR REEL SEAT

[75] Inventor: Ryuichi Ohmura, Shizuoka, Japan

[73] Assignee: Fuji Kogyo Co., Ltd., Japan

[21] Appl. No.: 929,349

[22] Filed: Nov. 12, 1986

[30] Foreign Application Priority Data

Dec. 26, 1985 [JP] Japan .......................... 60-200400[U]

[51] Int. Cl.⁴ ............................................ A01K 87/06
[52] U.S. Cl. ................................................... 43/22
[58] Field of Search ............................................ 43/22

[56] References Cited

U.S. PATENT DOCUMENTS

| 4,045,902 | 9/1977 | Ohmura | 43/22 |
| 4,050,179 | 9/1977 | Johnson | 43/22 |
| 4,083,141 | 4/1978 | Shedd et al. | 43/22 |
| 4,133,133 | 1/1979 | Casset | 43/22 |
| 4,485,580 | 12/1984 | Ohmura | 43/22 |
| 4,637,157 | 1/1987 | Collins | 43/22 |

FOREIGN PATENT DOCUMENTS 2017471 10/1979 United Kingdom ................ 43/22

Primary Examiner—Nicholas P. Godici
Assistant Examiner—Karen Skillman
Attorney, Agent, or Firm—Wegner & Bretschneider

[57] ABSTRACT

A tubular reel seat includes a pair of reel-leg fixing sleeves having the contours of a virtually frusto-conical shape, and at least one of said sleeves is slidable over a tubular body. The axes of the contours of said both sleeves are located upwardly of those of the mounting openings for the tubular body on the larger-diameter sides, and are substantially in coincidence therewith on the smaller-diameter sides.

4 Claims, 1 Drawing Sheet

TUBULAR REEL SEAT

BACKGROUND OF THE INVENTION

1. Field of the Invention

The present invention relates to a heavy type reel seat which has frusto-conical shaped sleeves for fixing reel legs.

2. Statement of the Prior Art

Heretofore, the heavy type reel seat which has frusto-conical shaped sleeves disclosed in, e.g., U.S. Pat. No. 4,083,141.

Such heavy type, the thickness of upper part of a hood member, is extremely thinner than that of the rest thereof. For that reason, actual strength of the hood member is considerably weak, then it may break to fail to tightly hold the reel leg in spite of heavy duty design. In addition, due to the fact that each of the fixing sleeve is of a frusto-conical shape, its bottom face extends considerably from the tubular body, thus posing a handling problem.

SUMMARY OF THE INVENTION

A primary object of the present invention is to provide a heavy type reel seat with frusto-conical shaped sleeves, which is free from such advantages as mentioned above.

According to the present invention, this object is achieved by the provision of a tubular reel seat including a pair of reel-leg fixing sleeves having the contours of a substantially frusto-conical shape, at least one of said sleeves being slidable over a tubular body, wherein:

the axes of the shapes of said both sleeves are located upwardly of those of the mounting openings for the tubular body on the larger-diameter sides and are substantially in coincidence therewith on the smaller-diameter sides.

Many other advantages, features and additional objects of the present invention will become apparent to those skilled in the art upon making reference to the detailed description and accompanying sheets of the drawings on which preferred structural embodiments incorporating the principles of the present invention are shown only by way of illustration.

DETAILED DESCRIPTION OF THE PREFERRED EMBODIMENTS

Figure 1:
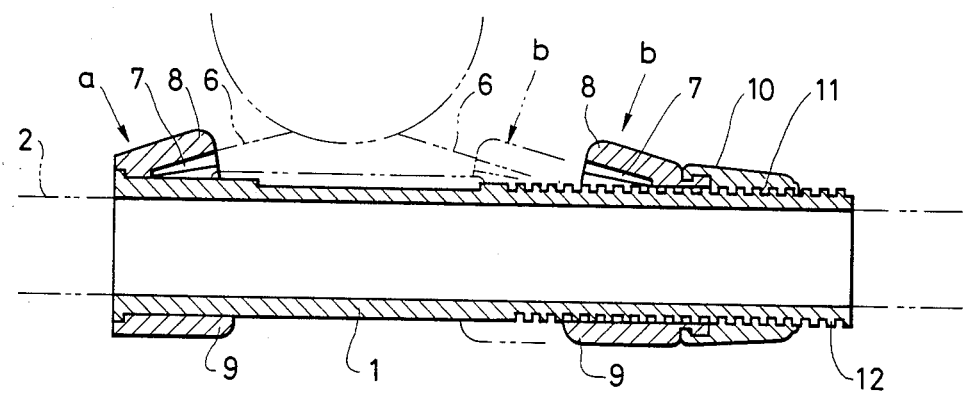
FIG. 1 is a longitudinally sectioned view showing one preferred embodiment according to the present invention.
Figure 2:
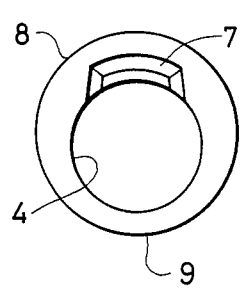
FIG. 2 is a front view of a fixing sleeve used in that embodiment.
Figure 3:
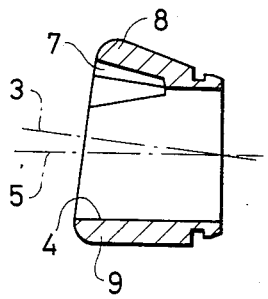
FIG. 3 is a longitudinally sectioned view showing that fixing sleeve.
Figure 4:
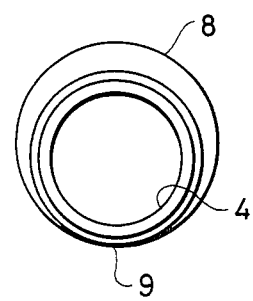
FIG. 4 is a rear view showing that fixing sleeve.

Referring to the drawings, the present invention generally provides a heavy type reel seat including a pair of reel-leg fixing sleeves fitted over a tubular body 1 and shown at a and b, the contours' axes 3 of which are inclined upwardly with respect to the axes 5 of the mounting openings for the tubular body 1 on the larger-diameter sides, whereby the thickness of upper part of a hood member 7 is made larger than that of the rest thereof for the purpose of reinforcement so as to reduce the amount of projection of the sleeves a and b from the tubular body 1, thereby achieving smooth handling.

More specifically, one fixing sleeve shown at a is fitted onto one end of a tubular body 1, said sleeve being in the form of a virtually frusto-conical shape. The other fixing sleeve, shown at b, is also in the form of a virtually frusto-conical shape, and is slidably fitted over the body 1 from the other end thereof. Each of the fixing sleeve a or b has its contour axis 3 inclined in such a manner that it is located upwardly with respect to an axis 5 of a mounting opening 4 for the tubular body on its opposite face, i.e., on its larger-diameter side, and is made coincident therewith on its smaller-diameter side, whereby a thicker portion 8 is formed on the upper side of the mounting opening 4, that is, on the outer circumference of a hood member 7 of a reel leg 6, and a thinner portion 9 is formed on the lower side of the mounting opening 4, said portion 9 being in parallel with the axis 5. A threaded tube 10 for rotatable connection to the fixing sleeve b includes a female thread 11 formed on its inner face, which is in threaded engagement with a male thread 12 formed on the outer face of the tubular body 1.

In the one embodiment of the tubular reel seat of the structure as described above, the tubular body 1 is first inserted over a fishing rod 2, as shown in FIG. 1. Then, the reel leg 6 is inserted at one end into the hood member 7 of one fixing sleeve and the other sleeve b is moved forward by operating the threaded tube 10 to insert the other end of the reel leg 6 into the hood member 7, whereby the reel is tightly fixed on the fishing rod 2.

It is understood that while the aforesaid embodiment has been described as fixedly fitting the tubular body 1 over the fishing rod 2, it may be made integral with a fishing-rod handle, as taught by the aforesaid U.S. Pat. No. 4,083,141.

It is also understood that the pair of fixing sleeves may both be slidable with respect to each other.

According to the present invention, improvements are made on the shapes of the pair of fixing sleeves fitted over the tubular body, whereby their contours' axes are inclined to increase the thickness of their upper portions of the hood member, which are required to have the highest strength, thereby preventing those portions from breaking. In addition, since the lower ends of the fixing sleeves on the larger-diameter sides are brought down to the thickness equal to that thereof on the smaller-diameter sides to decrease the amount of projection thereof from the tubular body, smooth handling is attained in use.

It is to be noted that many other changes or modifications may be made without departing from the scope of the present invention.

What is claimed is:

1. A tubular reel seat, comprising:
   a tubular body having first and second ends, wherein said first end has a plurality of external threads;
   first and second reel-leg fixing sleeves, each sleeve substantially having the shape of a truncated right angle cone defining first and second ends, and first and second side walls,
   wherein said first and second sleeves being longitudinally and rotatably slidable over said tubular body,
   wherein the first end of said sleeves defines a larger diameter than the diameter defined by the second end, wherein the axes defined by the sleeves are located upwardly relative to the first end and are substantially in coincident therewith on said second end, wherein the axis of the diameter of the first end is different from the axis of the diameter of the second end, wherein each of said sleeves defines a cross-section having third side walls which gradually enlarge from the second side wall to the first side wall, wherein the inner surface of the second side wall of said first sleeve contacts the external threads of said tubular body, wherein the second end of said second sleeve has a notch which mounts onto a protruding portion of the second end of said tubular body, and wherein the second end of said first sleeve directly couples to a tube mounted on said tubular body for mounting, with said second sleeve, a reel on said tubular body.

2. The tubular reel seat as in claim 1, wherein each of said sleeves has the axis of said second end generally parallel to the axis of said tubular body.

3. A fishing rod and reel combination, comprising:

a tubular body which fits onto a fishing rod, wherein said tubular body has first and second ends, wherein said first end has a plurality of external threads;

first and second reel-leg fixing sleeves, each sleeve substantially having the shape of a truncated right angle cone defining first and second ends, and first and second side walls, wherein said first and second sleeves being longitudinally and rotatably slidable over said tubular body, wherein the first end of said sleeves defines a larger diameter than the diameter defined by the second end, wherein the axes defined by the sleeves are located upwardly relative to the first end and are substantially in coincidence therewith on said second end, wherein the axis of the diameter of the first end is different from the axis of the diameter of the second end, wherein each of said sleeves defines a cross-section having third side walls which gradually enlarge from the second side wall to the first side wall, wherein the inner surface of the second side wall of said first sleeve contacts the external threads of said tubular body, wherein the second end of said second sleeve has a notch which mounts onto a protruding portion of the second end of said tubular body, and wherein the second end of said first sleeve directly coupled to a tube mounted on said tubular body for mounting, with said second sleeve, said reel on said tubular body.

4. The fishing rod and reel combination as in claim 3, wherein each of said sleeves has the axis of said second end generally parallel to the axis of said tubular body.

* * * * *